(12) United States Patent
Talmage, Jr.

(10) Patent No.: US 7,056,167 B1
(45) Date of Patent: Jun. 6, 2006

(54) LIFE BOOT

(76) Inventor: Robert N. Talmage, Jr., P.O. Box 2325, Acworth, GA (US) 30102

( * ) Notice: Subject to any disclaimer, the term of this patent is extended or adjusted under 35 U.S.C. 154(b) by 0 days.

(21) Appl. No.: 11/048,407

(22) Filed: Feb. 1, 2005

Related U.S. Application Data

(60) Provisional application No. 60/542,605, filed on Feb. 6, 2004.

(51) Int. Cl.
 *B63H 19/08* (2006.01)
(52) U.S. Cl. .................................................. 440/12.5
(58) Field of Classification Search ............... 114/365; 440/12.5

See application file for complete search history.

(56) References Cited

U.S. PATENT DOCUMENTS

| | | | |
|---|---|---|---|
| 2,096,167 A * | 10/1937 | Farrugia | 114/349 |
| 2,141,180 A * | 12/1938 | Bel Geddes | 114/369 |
| 3,931,868 A | 1/1976 | Smith | |
| 3,934,847 A | 1/1976 | Bentivegna | |
| 4,195,694 A | 4/1980 | Gizzarelli | |
| 5,110,071 A | 5/1992 | Hunter et al. | |
| 5,597,335 A * | 1/1997 | Woodland | 441/36 |
| 6,622,968 B1 * | 9/2003 | St. Clair et al. | 244/138 R |

* cited by examiner

*Primary Examiner*—Stephen Avila
(74) *Attorney, Agent, or Firm*—Rodgers & Rodgers

(57) ABSTRACT

A multipurpose amphibious vehicle is configured with an enclosed cabin to protect occupants from impacts, hazardous environments, fire and extreme temperatures. The vehicle can be deployed from an aircraft with a parachute to remote areas for rescue, relief and security operations. A helicopter transports the vehicle by air with a single quick attachment/release device. The vehicle equipped with armor materials and gun ports, is used in hostile environments and protects occupants from chemical and biological weapons.

26 Claims, 4 Drawing Sheets

LIFE BOOT

The benefits under 35 U.S.C. 119 are claimed of provisional application 60/542,605 filed Feb. 6, 2004.

FIELD OF THE INVENTION

This invention relates to transporting personnel and equipment in an enclosed protected vehicle to provide support, rescue, security and transportation operations on the land, in the water, or in the air. The invention floats in water and electric power provides propulsion. On land, the invention rides on skids, a trailer, another motorized vehicle, or is self-propelled with electric powered wheels. In the air, the invention is airdropped from a plane or suspended from a helicopter. Equipped with a parachute device and a deceleration device, the invention can safely parachute for deployment or parachute down from a stricken helicopter.

BACKGROUND OF THE INVENTION

Existing rescue vehicles are typically self-propelled and specifically designed for land, sea, or air rescue. Current land rescue vehicles are often equipped with four-wheel drive; yet, vast areas and terrains are still inaccessible. Helicopters may not be able to land in close proximity to the accident site; therefore, the injured must be transported to the helicopter or individually lifted from the site.

When a helicopter cannot land to load the injured, the crew has two courses for evacuation. One rescue method is referred to as a short haul. Used as such, the helicopter carries the endangered person suspended from the helicopter to the closest rescuers who transport the injured to the hospital. In other cases, the helicopter must winch the victim up to the helicopter for transportation to a hospital. This method is time consuming and dangerous. Operating this winch system requires a skilled operator such that his personal weight and the equipment weight reduce the helicopter's payload. A further problem is the strong motor wash below the helicopter. Avoiding this area requires the winch to work over longer distances and may exceed its capabilities.

We are aware of the current rescue shuttle manufactured by Advanced Rescue Technologies Inc., which offers protection and automated support of a victim while being transported to the helicopter or rescue vehicle. The rescue shuttle is shaped like a coffin, does not float, and is only large enough to accommodate the patient in the prone position. This rescue shuttle is too small for any other position, causing unpleasant claustrophobic reactions. Additionally, the shuttle has no safety parachute. It also requires a person skilled in the rescue shuttle to be present on the ground prior to helicopter extraction. Moreover, the patient is isolated while suspended on a sling during helicopter shuttling.

Various water rescue devices are available. Self-propelled vehicles are typically heavy and are not designed to be air lifted to an emergency. Various net baskets and devices have been developed to airlift water victims. Rafts are available which can be dropped from a helicopter and automatically inflated. Some rafts may even offer some sort of tent protection from the elements. Time is so critical in frigid water rescues that survival often depends on the minutes required to get to a protected environment.

Fully enclosed lifeboats are available on many ships and marine platforms, which offer protection from the elements and fire. Various methods and techniques are used to safely lower evacuees from marine vessels. The need to protect individuals from extreme environments is clearly visible in modem maritime safety. Unfortunately, there is no current vehicle which can rapidly deploy to an urban building or a remote disaster and deliver trained personnel with equipment and evacuate simultaneously with the injured in a protected vehicle.

The military has long desired to deploy men and equipment by parachute; yet, there is no current method to parachute multiple personnel in a protected vehicle with their equipment. The low altitude parachute extraction system (ALPES) has been widely used by the military since 1970 to parachute equipment. However, the proposed personnel capsule was abandoned because testing revealed objectionably high impact G forces. (reference U.S. Pat. No. 5,110,071).

Various patents have been issued with regard to the rescue of people from tall buildings or ships in a device suspended from a helicopter. Most of the prior art involves open platforms or net devices to carry survivors. Two U.S. patents, U.S. Pat. No. 3,931,868 Emergency Rescue Device by Charles P. Smith, Jr. dated Jan. 13, 1976 and U.S. Pat. No. 3,934,847 Rescue Capsule for Use with a Helicopter by Pasquale P. Bentivegna dated Jan. 27, 1976 describe an enclosed vehicle with doors.

Charles P. Smith, Jr. suspended his gondola on two cables from a helicopter and the invention involves a complicated and heavy apparatus to hold the gondola off the building and another apparatus to hold the gondola next to the building. Pasquale P. Bentivegna suspends his rescue capsule from two cables attached to winches, which can raise and lower the rescue capsule. In the lower position, a pivotal bridge apparatus folds down for victims to walk from the window of a burning building into the escape capsule. Raising the gondola to the helicopter allows occupants to move between the helicopter and rescue cabin.

U.S. Pat. No. 4,195,694 Rescue Vehicle by Nicolas Gizzarelli, Sr. dated Apr. 1, 1980 is also designed to rescue people from tall buildings yet describes an open vehicle. All of his embodiments utilize some form of propeller system to help position his vehicle. Additionally, one embodiment has wheels to drive on the road.

Prior art shows various rescue vehicles designed for specific rescue operations either in water, on land, or from high-rise buildings. Open nets and platforms are available which can be suspended or attached to a helicopter and rescue multiple individuals. No enclosed vehicle exists to carry personnel and equipment to and from an emergency. No other device is known, which can rescue multiple victims and uses a parachute device. Nor is it known to simultaneously transport personnel and equipment suspended from a helicopter.

BRIEF SUMMARY OF THE INVENTION

The present invention is an enclosed amphibious vehicle designed to transport multiple individuals, equipment and supplies on land, in water and in the air. The enclosed cabin and safety devices protect the occupants to offer a new method of transportation by integrating the invention with other equipment, aircraft or helicopter.

Operation of this vehicle on land is simplified by either towing, riding on a trailer, carrying it on a motorized vehicle or self-propelled with electric wheels to provide quiet tactical maneuvers. To minimize weight and complexity, the invention integrates with other equipment to provide suspension, braking and power for long distance, high speed, land transportation. The invention embodies electric wheels for self-propulsion and cushioning landing impacts.

Operation in water is accomplished by the natural weight distribution of the vehicle design and location of heavy equipment and supplies in the lower section, providing the low center of gravity necessary for the vehicle to float upright in water. A sponge/buoyant material provides floatation, insulation and protection. A steerable electric water propulsion device is embodied for water maneuvers.

Operation in the air is accomplished by using a helicopter to lift the vehicle with a line connected to the attachment/release device, or by using a plane to airdrop the invention and deploy its parachute device with a static line connected to the aircraft. Suspension and air bag devices protect the vehicle and occupants from landing impact loads.

The present invention is similar to the Battlefield Operations, Ordinance and Tactical Vehicle (BOOT-V) patent application Ser. No. 10/683,710 filed Oct. 14, 2003. The present invention also uses ballistic materials in fabrication to provide protection for security and military operations and embodies lightweight elastic armor to provide ballistic protection and reduce vehicle weight. A non-armored vehicle operates for civil, commercial and private use.

Embodied in this invention is the attachment/release device to safely disconnect from the helicopter. This attachment/release device is operated manually from within the cabin for normal separation from a helicopter line or in an emergency. An objective of this invention is the attachment/release device to quickly separate from the helicopter in an emergency in order to deploy the embodied parachute device.

A further objective of this invention is a parachute device and control system to safely lower the occupants and vehicle to the ground. This control system and sensors will provide automatic controls to deploy the parachute devices and air bags.

A still further object of the invention is a impact attenuation device such as airbags for emergency and parachute landings.

Another object of this invention is an electrical energy source to power the propulsion system, pneumatic system, lights, communications and other electrical equipment. The invention uses batteries or any preferred power source. A vent system is embodied to facilitate using a gas generator or combustible engine. The exhaust heat is used to heat the cabin.

A further object of the invention is an enclosed cabin, which accommodates multiple individuals. The cabin is water and airtight with a two-section rear main door and front deck door. Floating in the water, occupants open the top section of the rear main door and front deck door for ingress and egress.

A still further object of the invention is a sealed cabin to protect occupants from chemical, biological or hazardous environments and with an air supply system to provide a positive cabin pressure and reserve air. The enclosed cabin also protects the occupants and equipment from fire and extreme environments. Benches in the cabin secure occupants in the prone or seated position.

Yet another object of the invention is the floor/hull to permit the vehicle to be towed and skid over snow, ice and terrain, carried over land secured onto a trailer or motorized equipment and maneuvering in the water like a boat. Wheel devices recessed into the floor/hull extend to provide suspension and mobility. The electric wheels are controlled by separate switches, which enable the operator to steer the vehicle and perform 360-degree turns in place.

Another object of the invention is a remote control device to enable a remote operator to control and maneuver the vehicle. In this mode, the invention is deployed without personnel and operates remotely through hazardous areas to reach stranded survivors. This un-manned vehicle transports supplies through hostile environments to support special forces and evacuate injured soldiers.

A further object of the invention is an air supply system to operate vehicle components and the flame jets. Located on the vehicle's exterior are ports to spray a flammable liquid, which is ignited by a spark to repel rioters and attackers.

Still another object of the invention is a high intensity light device located on the exterior of the vehicle to flash a bright light out from the vehicle to temporarily blind aggressors looking towards the vehicle and illuminates the surroundings for the occupants.

Another object of the invention is a steerable sail device to control the vehicle when suspended from a helicopter. When the sail is deployed and the vehicle is traveling through the air, movement of the sail around its vertical axis acts like a rudder on an airplane to control yaw. When the vehicle is relatively stationary and suspended below the helicopter, pivoting the sail around its longitudinal axis and utilizing the helicopter's downwash will pivot the vehicle around its vertical axis to control its heading. When not in use, the sail folds similar to a pleated fan.

A still further objective of the present invention is to provide a front deck area above the bow to facilitate aerial work and water rescues.

Yet another object of the invention is to provide a rear deck attached to the rear of the cabin to support occupants during aerial and water maneuvers, increase floatation, storage and attach the electric water propulsion device and outboard motor.

A further objective of the present invention is to provide anchoring methods and apparatus to anchor the vehicle to a building or terrain. Designed with handrails and cleats, the Life Boot is secured by lines and grappling hooks to buildings, ships or terrain. The cleats also provide quick attachment and release from the carrying vehicle.

Other objects, features, and advantages of the invention shall be illustrated and become apparent as the description thereof proceeds with the drawing figures.

DETAILED DESCRIPTION OF THE INVENTION

Figure 1:
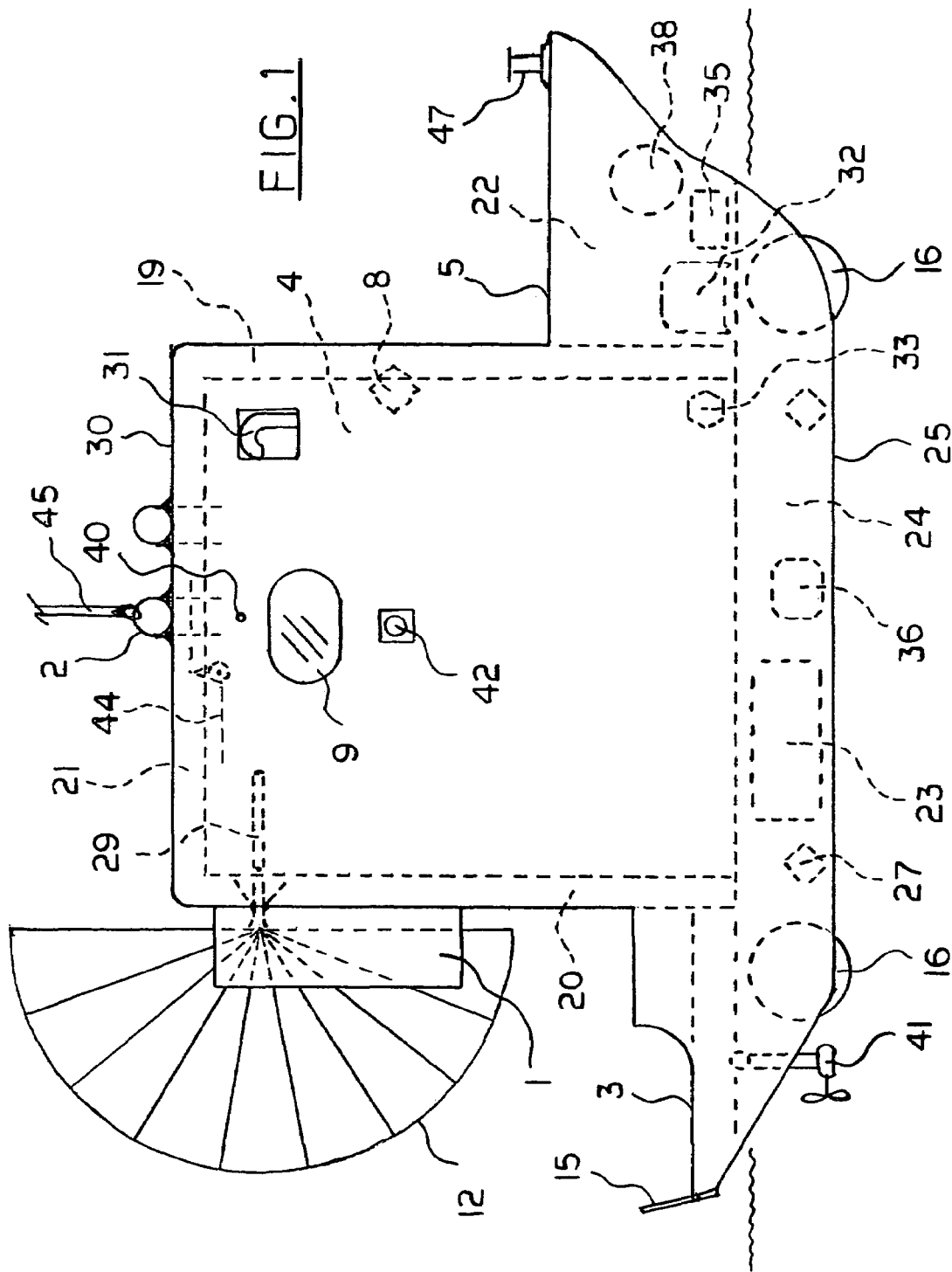
FIG. 1 is a side view of the present invention showing floatation on the water with the remote controlled water drive device in the deployed position.
Figure 2:
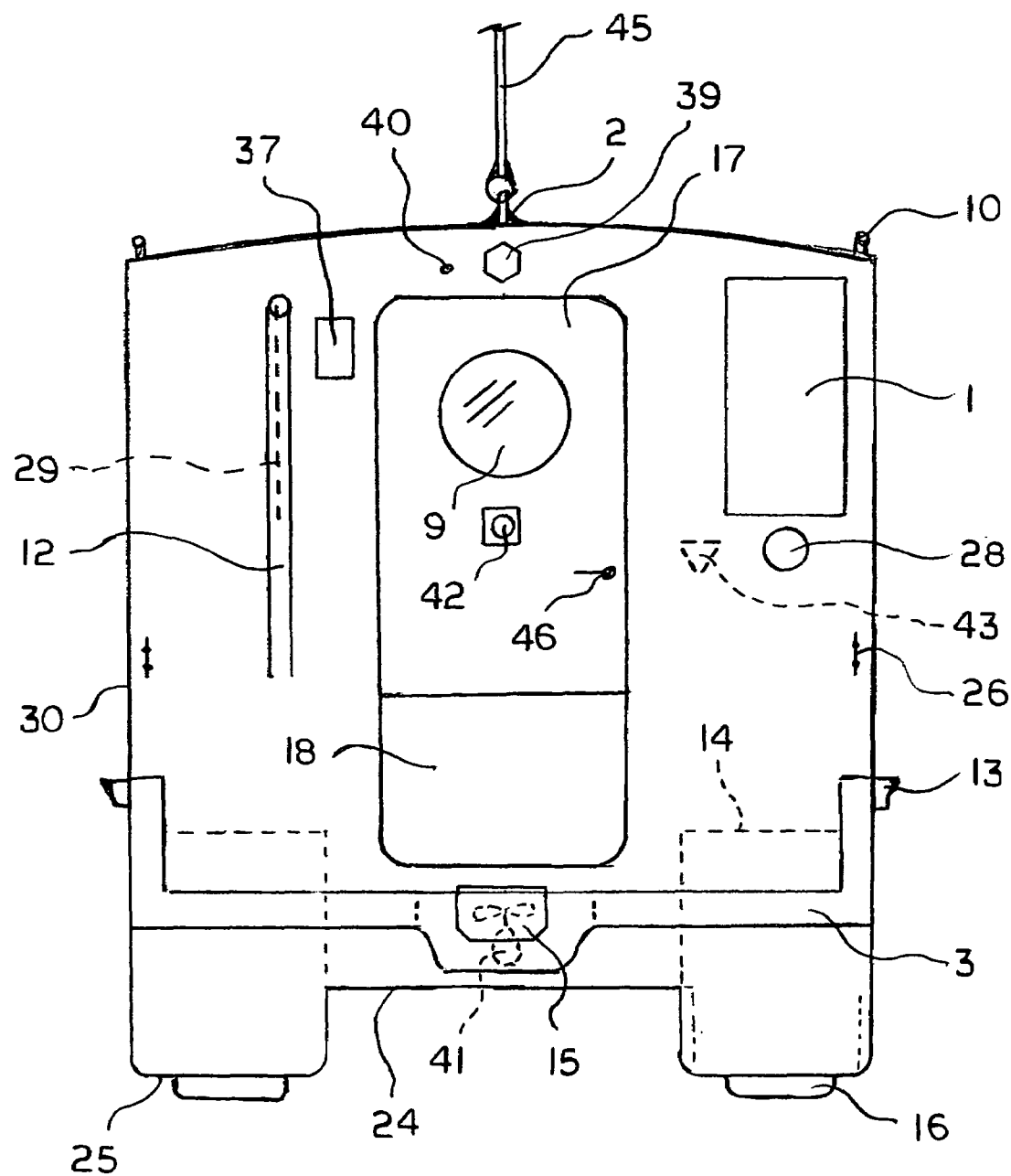
FIG. 2 is a rear view of the present invention showing the remote controlled water drive device retracted and recessed into the floor/hull and the sail device folded into the stored position.
Figure 3:
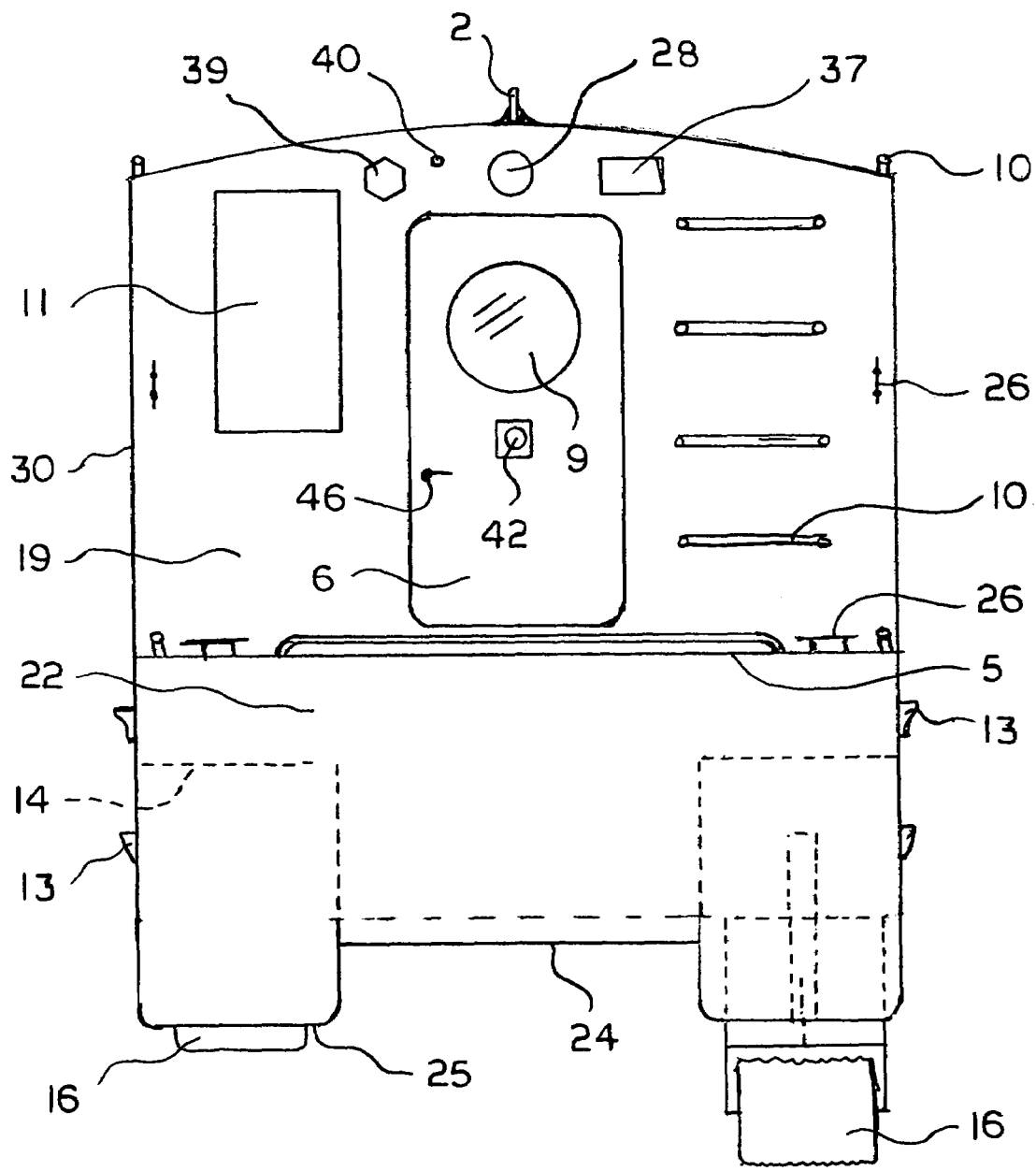
FIG. 3 is a front view of the present invention with one front wheel extended and the other front wheel retracted.

Referring to FIGS. 1, 2, 3 and 4, according to this invention, roof 21, front wall 19, two side walls 48 and rear wall 20 form an enclosed cabin 4 which is disposed on floor/hull 24. The cabin is framed with structural members and the exterior surface 30 is comprised of a rigid structural material attached to the framing members. The cabin is designed to withstand normal impact loads. This exterior structural material is weatherproof and provides structural integrity for the framed roof and walls. The Life Boot lifting and attachment devices are anchored to the framing members. A sponge/buoyant material in the cabin walls and roof provides insulation, floatation and occupant protection.

Floor/hull 24 functions as a floor in the cabin and as a sealed hull to operate in water. The floor/hull is streamlined to provide efficient water mobility and the contours of the floor/hull integrate with bow 22 and rear deck 3.

Main door 7 in the cabin is located in rear wall 20. The main door can be separated into top section 17 and bottom section 18, whereby, the bottom section can remain closed when operating on water and the top section can be opened to permit egress without the likelihood of a wave entering the cabin. The main door opens to a center isle with bench 14 on each side to restrain occupants in a prone or seated position. View port 9 provides visibility and light. Vent 37 provides cabin ventilation.

Attached to the front wall of the cabin is the bow section 22. The interior of the bow is accessible from the cabin through a sealed door in the front wall of the cabin. Above this door is the front deck door 6, which provides egress to the front deck 5 above the bow. This deck provides a platform to support aerial and water operations. On deck are handrails 10, cleats 26 and winch device 47. The streamlined contoured floor/hull design integrates with the bow section 22 to provide optimum water, skid and sled performance.

Air vent 31 provides fresh air and exhaust vent for the generator 32 disposed in bow section 22. Battery 35, fuel tank 38 and hazardous materials are contained in the bow section to be separated from the occupants in the cabin 4. Generator exhaust passes through heater 33 to provide cabin heat.

Rear deck 3 is used to support personnel for aerial rescue and water operations. Remote controlled water drive device 41 pivots downward from a recessed space contained in the rear deck to immerse the propeller into the water and maneuver the Life Boot. Motor bracket 15 pivots upward to mount an outboard motor for additional propulsion.

Figure 4:
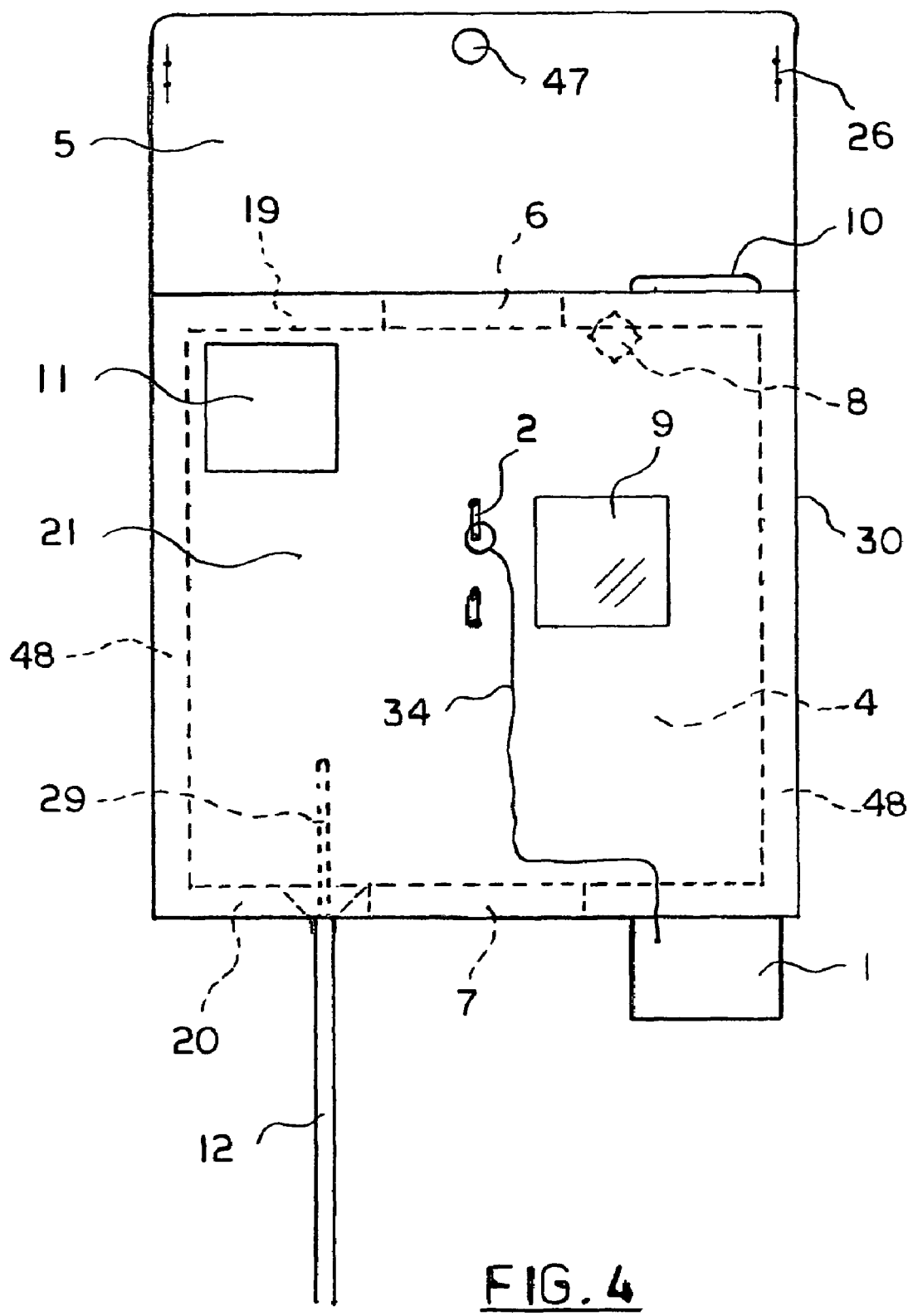
FIG. 4 is a top view of the present invention without a rear deck and showing the sail device and sail rod extended for operation.

Referring to FIG. 4 static line 34 is connected to parachute devise 1 and the attachment/release device 2. In the event of an in air emergency, the Life Boot operator pulls release handle 44 in FIG. 1 to withdraw pins from the attachment/release device 2 and releases the helicopter lift line 45. The static line is pulled up by the helicopter lift line and subsequently extracts the parachute. The automatic parachute control system 43 deploys airbags 27 and other deceleration means. The parachute line is connected to a second attachment/release device located on the roof. View port 9 permits the operator to observe the parachute canopy. If for some reason the parachute malfunctions, the operator can release a second attachment/release device and free the main parachute.

The reserve parachute 11 static line is connected to the main chute to extract the reserve as the second fail safe means. Either the main or the reserve parachute can be fired by the automatic parachute control system, static line or by manual operation.

Wheels 16 drop downward when the Life Boot is lifted to extend the suspension system and cushioned landing impact. The Life Boot operator controls the suspension system with a switch to raise or lower the vehicle. In the raised position, the electric wheels maneuver the vehicle over large obstacles. In the retracted position, the electric wheels recess into the floor/hull for water operations and allows skids 25 and floor/hull 24 to slide across snow and marsh. Winch device 47 pulls the Life Boot through inaccessible areas or winch the vehicle next to a building or terrain feature.

Each electric wheel 16 is controlled independently. Steering is accomplished by varying the amounts of forward or reverse control to the left and right wheels respectively. The Life Boot performs a 360-degree turn in place, similar to a tank, by applying forward motion to one side of the vehicle and reverse motion to the other side.

Civilian, commercial, and private operators employ a non-armored Life Boot to reduce weight. Vehicle weight is critical for each mode of the Life Boot methods of transportation. With respect to the flight features of the Life Boot, weight becomes even more critical.

The elastic armor design will reduce armor weight; yet still stop high-energy projectiles by placing a flexible ballistic material next to the interior surface of the Life Boot's exterior shell and attach it to the framing members with an elastic material. Sponge/buoyant material fills the remaining portion of the cabin walls to compress and absorb projectile energy as the flexible ballistic material contains the projectile. The sponge/buoyant material and elastic restraints on the flexible ballistic material will return to their original condition behind the exterior surface to absorb any further projectiles.

The Life Boot framing members and rigid exterior shell provide the vehicle's structural integrity. The sponge/buoyant material of the flexible armor design also provides a means of insulating the cabin, provides additional buoyancy, and cushions the interior of the cabin for occupants' safety. Gun port 42 is located in the wall or door to enable the firing of a weapon from within the cabin.

Pressurized air reserve 23 supplies air to eject a flammable liquid from flame jet port 40 located on the exterior of the vehicle. The operator uses a switch to activate a spark and ignite the liquid to repel attackers. The Life Boot exterior is heat resistant to withstand exposure to the flame jets and fire. The air reservoir also provides positive cabin pressure and reserve air in chemical, biological, or smoke filled environments. The air supply additionally recharges rescuers' air tanks.

High intensity light device 39 is located on the exterior of the vehicle to flash a bright light out from the vehicle to temporarily blind aggressors and illuminate the surroundings for the occupants. This light device is also used to attract survivors to rescue aid.

Video cameras located on the exterior of the vehicle provide visual images for a remote operator to control the Life Boot with remote controlled device 8. Remote control operation permits the vehicle to operate unmanned in hostile or hazardous environments to rescue or resupply security forces and evacuate injured. The unmanned vehicle also supports sensors to check areas for chemical agents, explosives or hostile targets. The generator 32 will power the electrical system to operate controls, electrical equipment, pumps, motors, communications, and weapons. A super conducting magnetic energy storage device 36 provides the means to provide a burst of energy to fire electronic weapons or perform extensive tactical maneuvers. By the superconducting magnetic energy device storing the low power capability of the generator over a period, it supplies the required quick burst of energy.

Sail device 12 is controlled by the sail rod 29 from within the cabin. When not in use, the sail device folds like a pleated fan. When unfolded, the fan extends up over the roof to form a half circle shape. The extended sail device extends out behind the vehicle and the sail rod pivots inside the cabin pointing forward. Operating the sail rod around its vertical axis moves the sail device in a similar fashion about its vertical axis to function like a rudder on an airplane. In such a manner, the Life Boot operator controls the vehicle's direction as it travels though the air horizontally as suspended from a helicopter.

When the Life Boot is not traveling forward and is suspended below the helicopter in the rotor downwash of air, the operator controls the Life Boot's direction by operating the sail device 12 around its horizontal axis. The Life Boot operator rotates the sail rod 29 around it's horizontal axis to move the sail device in a similar fashion to deflect the air stream from the helicopter and spin the vehicle left or right to control it's direction. In this manner, the Life Boot performs aerial maneuvers and rescues multiple victims from cliffs, buildings, or ships.

Step ledge 13 and handrail 10 provide access around the exterior of the Life Boot. Cleat device 26 provides means to quickly attach and release the vehicle from ships, buildings, terrain features, or other equipment.

Light device 28 illuminates the exterior and door latch 46 operates the doors from either inside or outside. Locking means on door latch provides vehicle security. Access door to the interior of the bow section is sealed to prevent fuel or exhaust fumes from entering the cabin or to contain a possible leak from the fuel tank 38 located in the bow section.

This invention embodies a method, whereby multiple individuals are transported on a trailer with equipment and supplies inside an enclosed protected vehicle and restrained in a prone or seated position. The trailer is equipped with emergency brakes activated by a brake away cable if the trailer should inadvertently separate from the towing vehicle. The enclosed vehicle is winched onto, driven onto, or lifted onto the trailer. The enclosed vehicle is then secured to the trailer. Personnel access the enclosed vehicle and restrain themselves inside the protection of the cabin. The occupants of the enclosed vehicle communicate with the tow vehicle by communication system, lights, or hand signals.

Hand held weapons are fired from the inside of the vehicle through gun port 42. The occupants can operated and fire electronic and other vehicle weapons systems.

Upon reaching the desired location, the trailer is stopped and the occupants inside the enclosed vehicle disembark or the vehicle is released from the trailer and maneuvers off the trailer with personnel remaining inside the vehicle.

This invention also embodies a method and means to parachute personnel, equipment, and supplies from an aircraft safely to the ground. The enclosed vehicle is loaded onto an aircraft and secured to the plane for transportation. Personnel enter the enclosed vehicle and secure themselves with restraining devices. The main parachute static line is connected to the aircraft. The aircraft opens the cargo door to deploy the enclosed vehicle. The enclosed vehicle is released from the aircraft and slid out of the plane. As the enclosed vehicle falls from the plane, the static line deploys the parachute. The landing gear or electric wheels extend and airbags deploy to cushion the landing impact. The vehicle safely comes down on any terrain, vegetation, or body of water.

Upon landing, the parachute is released with the attachment/release device 2 and occupants can remove their restraints to exit the vehicle or remain inside and operate the vehicle.

This invention additionally embodies a method and means to safely transport personnel, equipment and supplies suspended from a helicopter. The enclosed vehicle is loaded with supplies and personnel restrained in the appropriate devices. A lift line from a helicopter is attached to the attachment/release device 2. The helicopter lifts the enclosed vehicle and the wheels drop down to reach the maximum shock absorbing length. The occupants of the enclosed vehicle communicate with the aircrew by a communication system, lights, or hand signals. Airbags are deployed if the parachute control system senses an extended free fall condition, such as may result from an inadvertent release from the helicopter.

The helicopter places the enclosed cabin at the desired location without the risk of the helicopter hitting obstacles or the dangers associated with ground disturbance from the rotor wash. Upon landing, the enclosed vehicle releases the helicopter and occupants can exit the vehicle or remain inside to operate the vehicle.

In the case of an in flight helicopter emergency, the operator inside the enclosed vehicle pulls the release handle 44 to release the attachment/release device 2 and, subsequently, the helicopter lift line 45. The lift pulls the static line to deploy the parachute device. The automatic parachute control system deploys the airbags and the enclosed vehicle parachutes safely to the ground. The occupants release the parachute with the attachment/release device and exit the vehicle or remain inside and operate the vehicle.

Other improvements, modifications and embodiments will become apparent to one of ordinary skill in the art upon review of this disclosure. Such improvements, modifications and embodiments are considered to be within the scope of this invention as defined by the following claims.

The invention claimed is:

1. An amphibious vehicle comprising:
   an enclosed cabin, said cabin having a floor/hull, a roof, two side walls, a front wall and a rear wall;
   a bow section attached to the front wall of said cabin with an access door to the interior of a bow section;
   an attachment/release device secured to said roof of the said cabin to lift said vehicle;
   a parachute attached to said attachment/release device;
   a deceleration device attached to said floor/hull to cushion landing impact;
   a water propulsion device attached to said floor/lull; and
   a remote control device to operate said water propulsion device.

2. The amphibious vehicle of claim 1 wherein said parachute is attached to said cabin.

3. The amphibious vehicle of claim 1 wherein said vehicle comprises armored materials and a gun port.

4. The amphibious vehicle of claim 3 wherein flexible bullet resistant material is elastically attached to the interior of said vehicle.

5. The amphibious vehicle of claim 1 wherein said vehicle includes an electrical power source, fuel, controls, electrical storage device and means to power and operate motors, pumps, communications, electronics, weapons, and electrical systems.

6. The amphibious vehicle of claim 5 wherein independently suspended and controlled electric wheels are attached to said floor/hull.

7. The amphibious vehicle of claim 1 wherein attachment/release devices are secured to the exterior of said vehicle.

8. The amphibious vehicle of claim 1 wherein a rear deck is attached to said rear wall.

9. The amphibious vehicle of claim 1 wherein said vehicle includes deceleration means associated with said floor/hull.

10. The amphibious vehicle of claim 1 wherein said vehicle includes rear and front doors.

11. The amphibious vehicle of claim 1 wherein a step ledge and handrails are secured to the exterior of said vehicle.

12. The amphibious vehicle of claim 1 wherein said vehicle includes foldable sail device attached to said rear wall.

13. The amphibious vehicle of claim 1 wherein said vehicle comprises a motor bracket secured to the rear of said vehicle.

14. An enclosed amphibious vehicle comprising:
an enclosed cabin, said cabin having a floor/hull, a roof, two side walls, a front wall and rear wall, said cabin containing personnel restraining and protection devices, rear access door, front access door to the deck area above the bow section, window aperture, air vent, electrical equipment, and controls;
a bow section attached to said cabin includes an access door to the interior of said bow section from the said cabin, electrical storage device, electrical power generator, electrical equipment, fuel, front pair of independently suspended and controlled electric wheels, equipment, tools and supplies;
an attachment/release device secured to the roof of the said cabin to lift the said vehicle into the air;
an electrical water propulsion device attached to said floor/hull to maneuver said vehicle on the water;
a manual electric control device attached to said cabin to control the suspension, electric wheels and water propulsion device;
a remote control device linked to control the suspension, electric wheels and water propulsion device;
a rear pair of independently suspended and controlled electric wheels attached to said floor/hull;
a split rear access door located in said rear wall whereby the top section of said door opens while the bottom section remains closed; and
a sponge/buoyant material disposed within said roof, walls, and floor/hull.

15. The amphibious vehicle of claim 14 wherein said vehicle comprises exterior ports and a pressurized flammable liquid is delivered to said ports ignited by a spark.

16. The amphibious vehicle of claim 14 wherein said vehicle includes video cameras secured to the said vehicle to relay video to a remote operator.

17. The amphibious vehicle of claim 14 wherein said vehicle includes an air pump to provide pressurized air.

18. The amphibious vehicle of claim 14 wherein a high intensity light device is attached to the exterior of said vehicle.

19. The amphibious vehicle of claim 14 wherein said vehicle includes a superconducting magnetic energy storage device.

20. The amphibious vehicle of claim 14 wherein a parachute is attached to said cabin.

21. An enclosed amphibious vehicle comprising:
an enclosed cabin, said cabin having a floor/hull, a roof, two side walls, a front wall and a rear wall;
a bow section attached to the front wall of said cabin with an access door to the interior of said bow section;
an attachment/release device secured to said roof of the said cabin to lift said vehicle;
a deceleration device attached to said floor/hull to cushion landing impact;
a water propulsion device attached to said floor/hull;
a remote control device to operate said water propulsion device; and
said vehicle comprising armored materials and a gun port.

22. The amphibious vehicle of claim 21 wherein flexible bullet resistant material is elastically attached to the interior of said vehicle.

23. An enclosed amphibious vehicle comprising:
an enclosed cabin, said cabin having a floor/hull, a roof, two side walls, a front wall and a rear wall;
a bow section attached to the front wall of said cabin with an access door to the interior of said bow section;
an attachment/release device secured to said roof of the said cabin to lift said vehicle;
a deceleration device attached to said floor/hull to cushion landing impact;
a water propulsion device attached to said floor/hull;
a remote control device to operate said water propulsion device; and
said vehicle including an electrical power source, fuel, controls, electrical storage device and means to power and operate motors, pumps, communications, electronics, weapons, and electrical systems.

24. The amphibious vehicle of claim 23 wherein independently suspended and controlled electric wheels are attached to said floor/hull.

25. An enclosed amphibious vehicle comprising:
an enclosed cabin, said cabin having a floor/hull, a roof, two side walls, a front wall and a rear wall;
a bow section attached to the front wall of said cabin with an access door to the interior of said bow section;
an attachment/release device secured to said roof of the said cabin to lift said vehicle;
a deceleration device attached to said floor/hull to cushion landing impact;
a water propulsion device attached to said floor/hull;
a remote control device to operate said water propulsion device; and
said vehicle including a foldable sail device attached to said rear wall.

26. The amphibious vehicle of claim 1 wherein a deck is formed on the upper portion of said bow section and is accessible through said access door.

* * * * *